United States Patent
Pauc et al.

(10) Patent No.: US 6,470,936 B2
(45) Date of Patent: Oct. 29, 2002

(54) WHEEL WITH RIM HAVING SEATS INCLINED TOWARD THE OUTSIDE

(75) Inventors: Gilbert Pauc, Cebazat (FR); Thomas Emberger, Clermont-Ferrand (FR)

(73) Assignee: Michelin Rescherche et Techniques, S.A. (CH)

(*) Notice: Subject to any disclaimer, the term of this patent is extended or adjusted under 35 U.S.C. 154(b) by 0 days.

(21) Appl. No.: 09/765,130

(22) Filed: Jan. 18, 2001

(65) Prior Publication Data
US 2001/0020506 A1 Sep. 13, 2001

Related U.S. Application Data

(63) Continuation of application No. PCT/EP99/04463, filed on Jun. 28, 1999.

(30) Foreign Application Priority Data

Jul. 20, 1998 (FR) .............................................. 98/09387

(51) Int. Cl.[7] .............................................. B60B 21/02
(52) U.S. Cl. ................... 152/379.5; 301/95.109
(58) Field of Search ..................... 152/381.5, 381.6, 152/400, 516, 520, 379.5; 301/95.129

(56) References Cited

U.S. PATENT DOCUMENTS

| 4,177,849 A | * | 12/1979 | Osada et al. |
| 4,293,016 A | * | 10/1981 | Bible et al. |
| 4,561,482 A | | 12/1985 | Tavazza et al. |
| 4,572,265 A | | 2/1986 | Lescoffit |
| 4,953,291 A | * | 9/1990 | Markow |
| 5,000,241 A | * | 3/1991 | Patecell |
| 5,634,993 A | * | 6/1997 | Drieux et al. |
| 5,891,279 A | * | 4/1999 | Lacour |
| 6,035,913 A | | 3/2000 | Bapt et al. |

FOREIGN PATENT DOCUMENTS

DE        19721860        11/1997

* cited by examiner

*Primary Examiner*—Russell D. Stormer
(74) *Attorney, Agent, or Firm*—Baker Botts LLP (57) ABSTRACT

A wheel having a rim with first and second rim seats, at least the first rim seat having a generatrix, the axially outer end of which is on a circle of diameter less than the diameter of the circle on which the axially inner end is located, the first rim seat being extended axially outward by a low protrusion or hump and axially inward by a bearing surface intended to receive a tread support ring, and a wheel disk, joined on the side of the first rim seat to the radially inner wall of the rim, characterized in that the rim bearing surface includes first and second support zones separated by a circumferential groove which opens radially outward.

17 Claims, 7 Drawing Sheets

WHEEL WITH RIM HAVING SEATS INCLINED TOWARD THE OUTSIDE

This is a continuation of pending PCT/EP99/04463, filed Jun. 28, 1999.

BACKGROUND OF THE INVENTION

The invention concerns a wheel having a disk and a rim for a tire and capable of forming with a support ring for the tire tread and the tire, a rolling assembly that can be useful in running when the inflation pressure drops abnormally below the normal pressure of use, called nominal service pressure, which can even become nil.

The principal difficulties encountered in running flat or at low pressure involve the risks of unseating of the beads of the tire and, in particular, of unseating of the bead situated on the outer side of the tire mounted on the outer side of the vehicle on making a turn.

U.S. Pat. No. 6,035,913 describes, by way of example, a wheel intended to solve the above-mentioned problem efficiently. That wheel comprises, seen in meridian section, a rim with first and second rim seats, at least the first rim seat having a generatrix, the axially outer end of which is on a circle of diameter less than the diameter of the circle on which the axially inner end is located, the first rim seat being extended axially outward by a low protrusion or hump and axially inward by a bearing surface intended to receive a tread support ring, and a wheel disk, joined on the side of the first rim seat to the radially inner wall of the rim. That wheel is such that the rim bearing surface, intended to receive the support ring, is equipped with elements in relief separated by recesses or hollows.

Those recesses or hollows in the bearing surface of the support ring are intended to limit the weight of the wheel.

That limitation can, however, prove inadequate, notably in case design imperatives require connecting the outer profile of the disk directly to the outer seat (wheel described as "full face"). That wheel also presents construction difficulties, particularly when it is desired to make a sheet metal wheel.

SUMMARY OF THE INVENTION

The invention concerns a wheel which appreciably improves the previous wheel. The wheel of the invention is composed of a rim with first and second rim seats, at least the first rim seat having a generatrix, the axially outer end of which is on a circle of diameter less than the diameter of the circle on which the axially inner end is located, said first rim seat terminating at its axially outward end in a flange and being extended axially inward by a bearing surface intended to receive a tread support ring, and of a wheel disk, joined on the side of the first rim seat to the radially inner wall of the rim. The wheel is characterized in that the rim bearing surface consists of first and second support zones separated by a circumferential groove opening radially outward.

It has been found that the presence of two support zones is sufficient to ensure good stability of certain types of support rings, without the need for the presence of ribs.

The wheel of the present invention has the advantage of significantly reducing the weight of the wheel.

The circumferential groove can advantageously serve as a housing for a pressure monitoring device.

It is also possible to cover the circumferential groove radially on the outside, at least in part, with a cylindrical hoop-shaped support intended to receive a tread support ring.

The wheel has the advantage of presenting two support zones reduced to a minimum, which make possible a remarkable reduction in weight. In that wheel the bearing function of the support ring is secured by a generally ring-shaped support, containing holes or not, and which can be in one piece with the wheel removably or not or even with the support ring. That makes it possible to design full-face wheels of acceptable weight.

The wheel according to the invention can have a rim made from steel or aluminum alloy sheet metal. The disk can also be made from such sheet metal. The connection between the disk and the rim is then advantageously made by insertion under the circumferential groove.

The invention will be better understood by means of the attached drawings, illustrating nonlimitative working examples of a wheel designed for mounting of a 185/610 R 400 tire.

DESCRIPTION OF PREFERRED EMBODIMENTS

Figure 1:
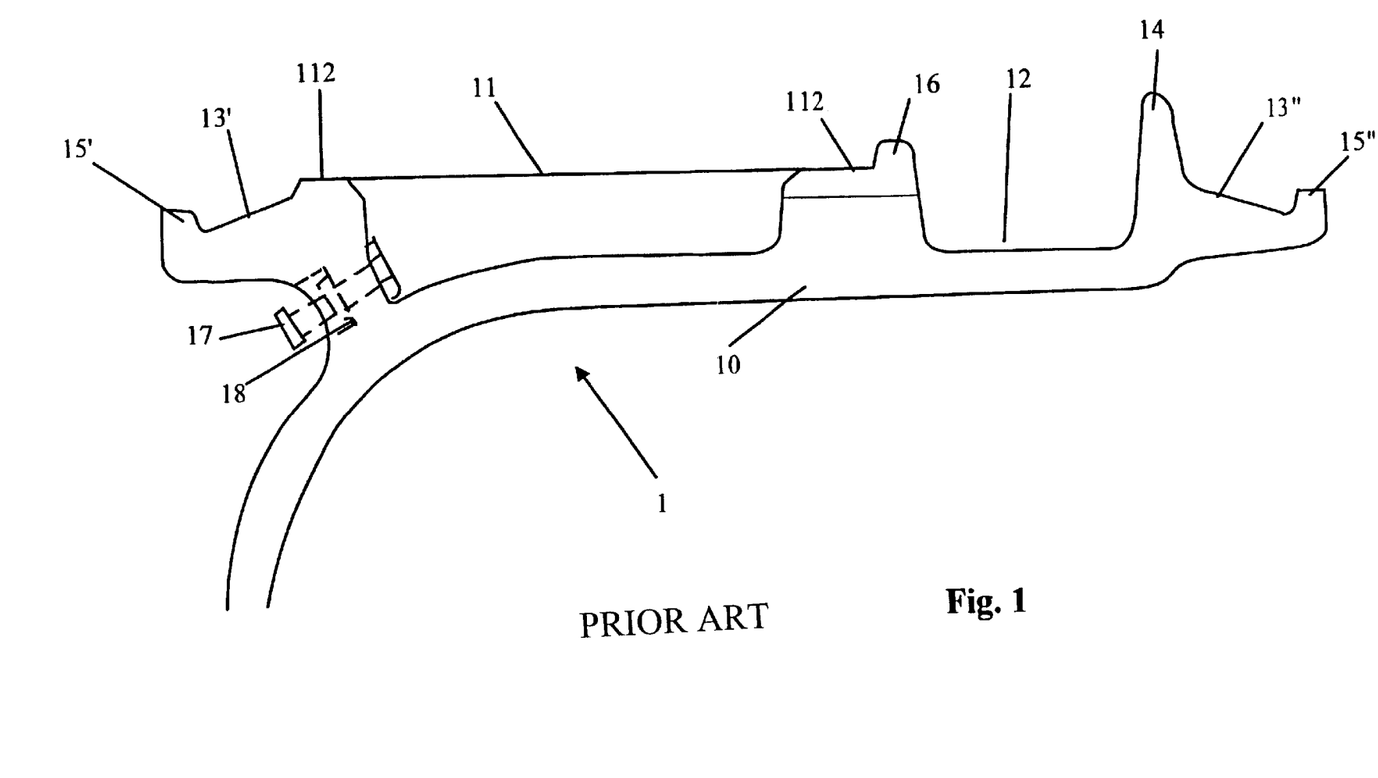
FIG. 1 is a schematic meridian view of a monobloc wheel, as described in the aforesaid European application.
Figure 2:
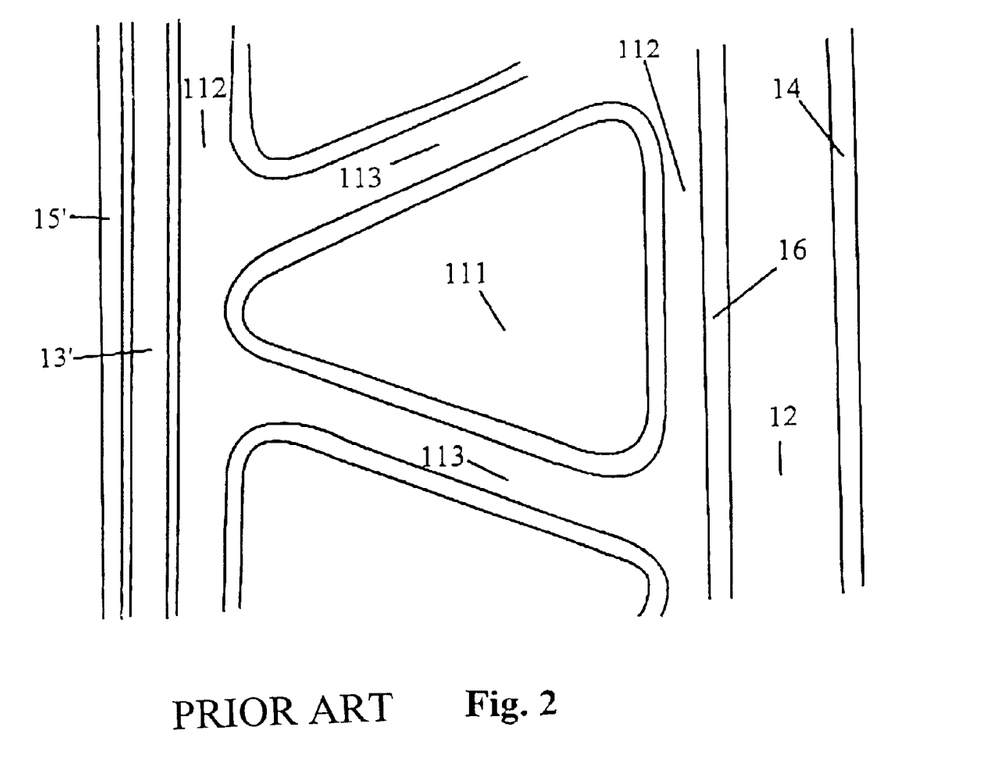
FIG. 2 is a top view of the rim of FIG. 1.

FIG. 1 presents, in meridian and schematic view, a monobloc wheel 1, as disclosed in patent application EP 0 807 539. That wheel comprises a rim 10 with two rim seats 13' and 13" of equal diameter and the generatrices of which are inclined outward. The two seats terminated at their axially outward ends in flanges 15' and 15". The outer seat 13' is extended axially inward by a bearing surface 11, equipped in turn on its other end with a positioning stop 16 for a support ring intended to be mounted on that bearing surface 11. The inner seat 13" is extended axially inward by a rim flange 14, delimiting with the positioning stop 16 a mounting groove 12. As FIG. 2 illustrates, the bearing surface 11 is equipped with triangular-shaped recesses 111. Those recesses 111 are axially delimited axially by the transverse ribs 113 of the bearing surface and circumferentially by circumferential ribs 112.

Figures 3A, 3B:
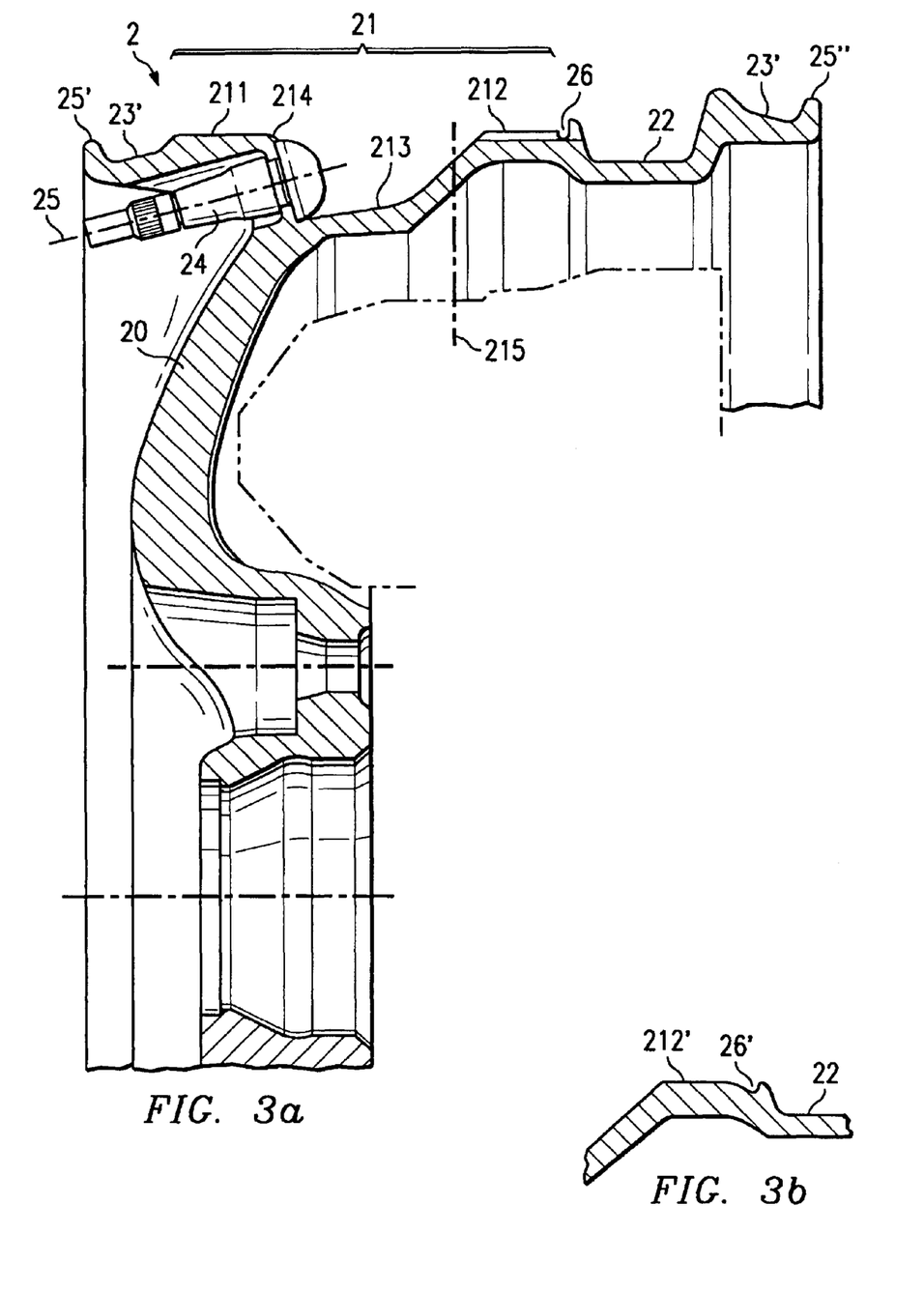
FIG. 3(a) is a schematic meridian view of a monobloc wheel according to the invention and FIG. 3(b) is a variant of that wheel.

The wheel 2, shown on FIG. 3(a), largely repeats the characteristics of the wheel 1 presented on FIG. 1. It differs, however, in that the diameters of the two seats 23' and 23" are unequal, the first seat 23', placed on the outer side of the wheel 2, having a diameter less than that of the second seat 23". That makes it possible to reduce the depth of the mounting groove 22. As in the wheel 1 of FIG. 1, the two seats 23' and 23" terminate at their axially outward ends in flanges 25' and 25", respectively.

In accordance with the invention, the bearing surface 21 of that wheel 2 consists of a first support zone 211 and a second support zone 212 separated by a circumferential groove 213 opening radially outward.

That circumferential groove makes it possible to reduce substantially the weight of the wheel 2 relative to the wheel 1 and greatly facilitates construction.

The second support zone 212 contains a radially outer protrusion 26 serving as axial stop for a support. There can also be a radially inner protrusion 26', as illustrated on FIG. 3(b). In that case, the inner surface of the support contains a rib of suitable shape for being locked inside on mounting on the wheel 2. Such a support is made preferably of rubber (see FIG. 5).

The wheel 2 also contains valve hole 24 placed in the outer edge 214 of the circumferential groove 213. That valve hole emerges outside the disk 20.

Figure 4:
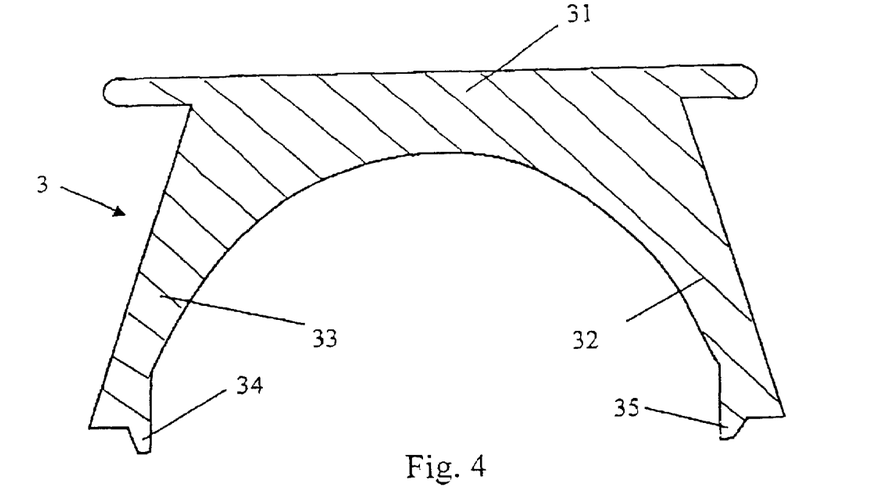
FIG. 4 is a view in meridian section of a thermoplastic support ring.

The two support zones 211 and 212 are adapted to receive a support ring such as that presented in meridian section on FIG. 4. That support ring 3 comprises an annular crown 31 intended to come in contact with the tire tread in case of serious reduction of the tire inflation pressure. Two bases 32 and 33 extend radially inward from the crown. Those bases have their ends fitted, when the support ring is mounted on the wheel 2, to bear on the two support zones 211 and 212. Lugs 34, 35, bearing on the inner edges 214 and 215 of the support zones 211 and 212, prevent any axial sliding outward of the bases 32 and 33 from the circumferential groove 213. Those bases are evenly distributed on the circumference of the support ring. The support ring 3 can be made of reinforced thermoplastic material. The shape of the support ring makes possible its ovalization on mounting in a tire prior to mounting of the tire and support wheel assembly around the wheel 3.

Support rings essentially made of rubber can also be used, as described, for example, in U.S. Pat. No. 5,891,279 and presented in FIG. 5. Such a support ring 4 contains a generally ring-shaped base 41 reinforced by a longitudinally oriented ply 411, a roughly ring-shaped crown 42, with longitudinal grooves 421 on its radially outer wall and a ring-shaped connecting body 43 between the base and the crown. The ring-shaped connecting body 43 contains a first solid part 431 as well as a second part 432 containing recesses extending axially over roughly more than half the body 43 and emerging on the outer side of the support. Those recesses are evenly distributed over the circumference of the body 43 and define radial walls.

Figure 5:
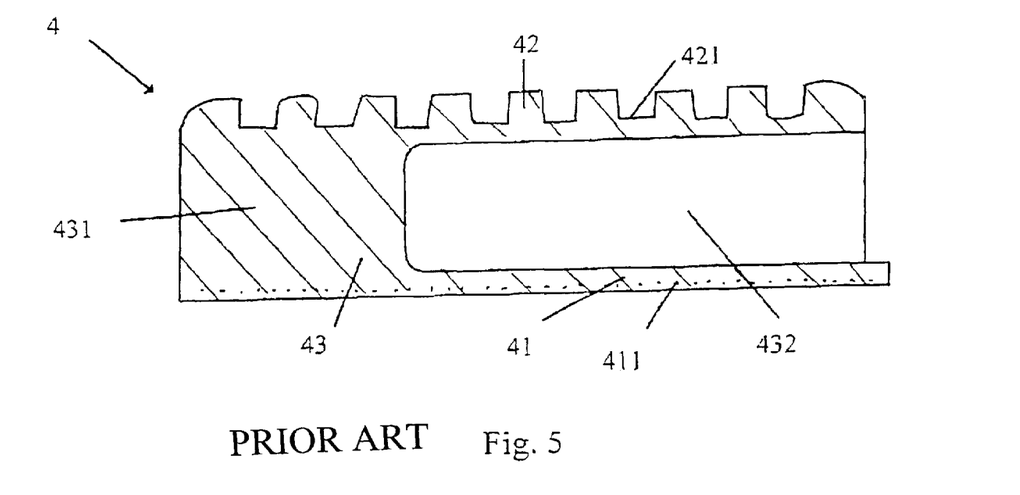
FIG. 5 is a view in meridian section of a rubber support ring.

For such support rings, the two support zones may have an insufficient surface and that limits the efficiency of running flat.

Figure 6:
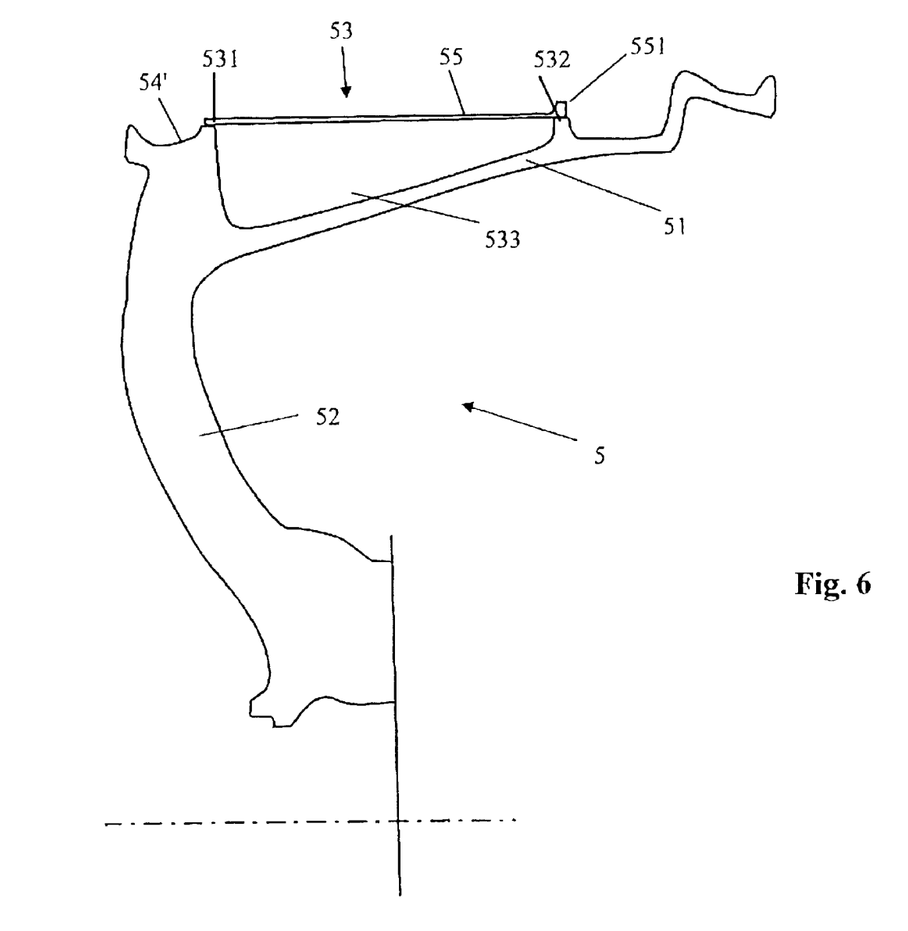
FIG. 6 is a view similar to FIG. 2 of a variant of a monobloc wheel according to the invention.

In that case, FIG. 6 presents a monobloc wheel 5, in which the bearing surface 53 contains two support zones 531 and 532 separated by a circumferential groove 533. The two support zones serve as bearing for a support 55 of a support ring similar to that of FIG. 5. The support 55 is ring-shaped and is a metal hoop with a radially outer protrusion 551 placed at its axially inner end, intended to block the axial displacement of the support ring.

The support 55 is rigidly fastened to the bearing surface 53, for example, by welding, crimping or gluing. It can also be removably fastened or form part of the support ring.

This method of construction of a wheel according to the invention makes it possible to increase the axial width of the circumferential groove 533 very appreciably and therefore to reduce the total weight of the wheel markedly. That is particularly important when designing wheels, like that of FIG. 6, the disk 52 of which is connected to the rim 51 directly under the outer seat 54' (full-face wheel).

Figure 7:
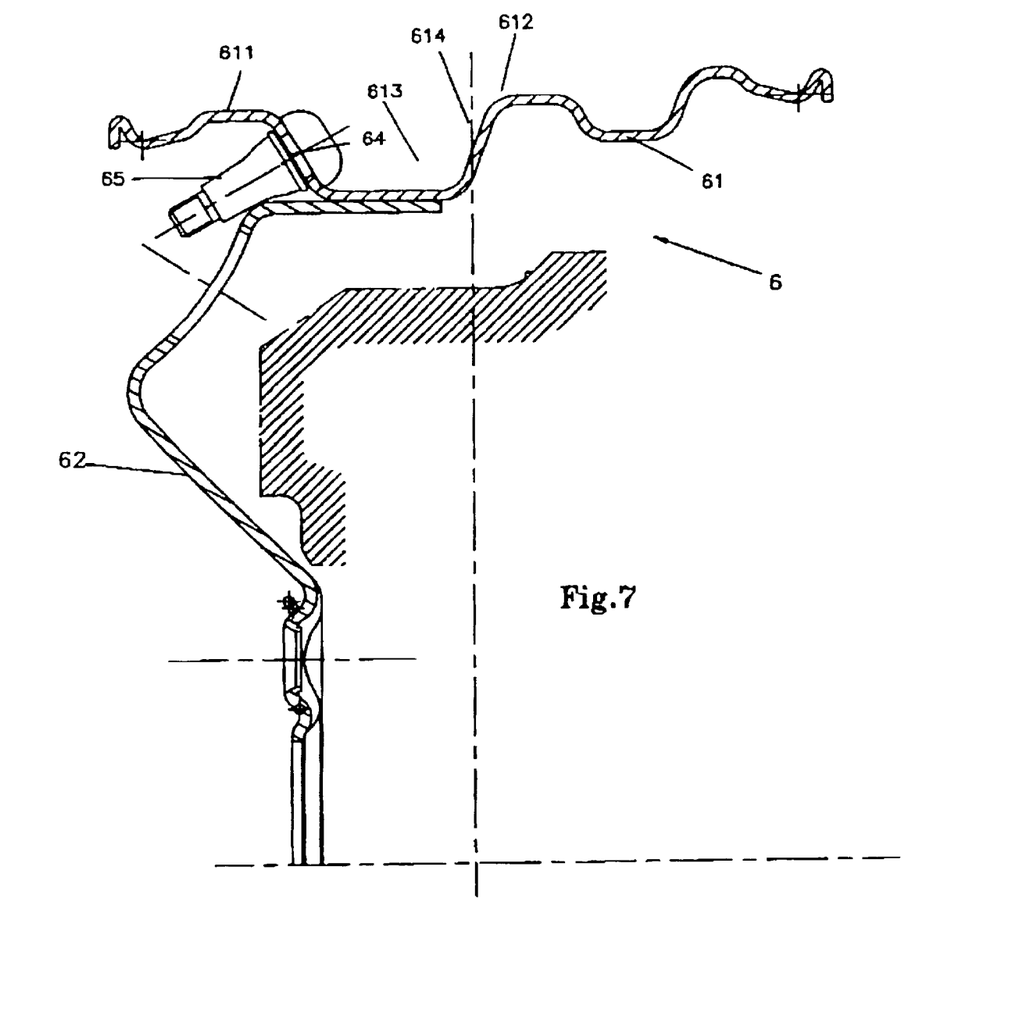
FIG. 7 is a view similar to FIG. 2 of a sheet metal wheel according to the invention.

FIG. 7 presents a wheel 6 similar to the monobloc wheel 2 of FIG. 3, but obtained by assembly of a rim 61 and a disk 62 made from sheet steel. The assembly is carried out by inserting the disk 62 under the circumferential groove 613. As previously, the valve 65 crosses the outer edge of the groove 613 through the hole 64 and emerges outside the disk 62. The wheel 6 can also be made of sheet aluminum.

The main difference, outside of the method of construction of the wheel, lies in the fact that the diameter of support zone 612 is greater than that of support zone 611. Consequently, a support ring, as presented on FIG. 5 and properly stiffened in order to work efficiently on bearing on both zones 611 and 612, is locked against the inner edge 614 of the groove 613 and zone 612. The base 41 of the support 4 preferably has its outer geometry adapted to bear on the edge 614 and support zone 612.

Figure 8:
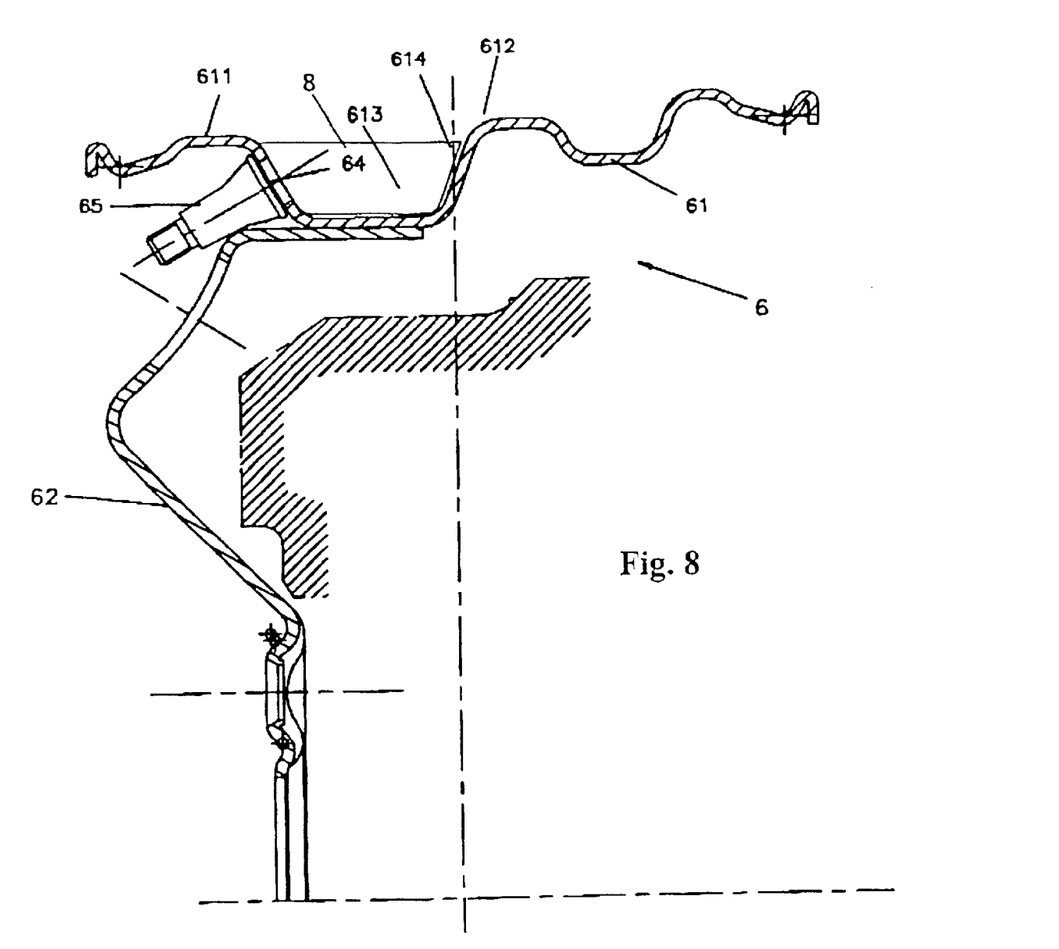
FIG. 8 shows a wheel identical to that of FIG. 7 equipped with a pressure monitoring device.

The circumferential groove of the wheels according to the invention can advantageously serve as housing for a tire pressure monitoring device 8. That device 8 can, notably, be fastened to the valve 65, as illustrated on FIG. 8.

We claim:

1. A wheel comprising a rim with first and second rim seats, at least the first rim seat having a generatrix, the axially outer end of which is on a circle of diameter less than the diameter of the circle on which the axially inner end is located, said first rim seat being terminated at its axially outward end by a flange and being extended axially inward by a bearing surface intended to receive a tread support ring, and a wheel disk joined on the side of the first rim seat to the radially inner wall of the rim, wherein the rim bearing surface includes first and second support zones separated by a circumferential groove having a radially outward opening, and which the second support zone, on the side of the second rim seat relative to the groove, contains a radially outer protrusion intended to block the axial displacement of a supporting ring.

2. A wheel comprising a rim with first and second rim seats, at least the first rim seat having a generatrix, the axially outer end of which is on a circle of diameter less than the diameter of the circle on which the axially inner end is located, said first rim seat being terminated at its axially outward end by a flange and being extended axially inward by a bearing surface intended to receive a tread support ring, and a wheel disk joined on the side of the first rim seat to the radially inner wall of the rim, wherein the rim bearing surface includes first and second support zones separated by a circumferential groove having a radially outward opening, and in which the second support zone, on the side of the second rim seat relative to the groove, contains a radially inner protrusion intended to block the axial displacement of a support ring.

3. A wheel comprising a rim with first and second rim seats, at least the first rim seat having a generatrix, the axially outer end of which is on a circle of diameter less than the diameter of the circle on which the axially inner end is located, said first rim seat being terminated at its axially outward end by a flange and being extended axially inward by a bearing surface intended to receive a tread support ring, and a wheel disk joined on the side of the first rim seat to the radially inner wall of the rim, wherein the rim bearing surface includes first and second support zones separated by a circumferential groove having a radially outward opening, in which the second support zone, on the side of the second rim seat relative to the groove, has a a diameter greater than that of the first support zone, an edge connecting the circumferential groove and said second support zone serves to prevent a support ring from moving axially.

4. A wheel comprising a rim with first and second rim seats, at least the first rim seat having a generatrix, the axially outer end of which is on a circle of diameter less than the diameter of the circle on which the axially inner end is located, a circumferential mounting groove located adjacent the axially inner end of the second rim seat, said first rim seat being terminated at its axially outward end by a flange and being extended axially inward by a bearing surface intended to receive a tread support ring, and a wheel disk joined on the side of the first rim seat to the radially inner wall of the rim, wherein the rim bearing surface includes first and second support zones separated by a second circumferential groove having a radially outward opening, the first support zone is located adjacent the axially inner end of the first rim set and the second support zone is located adjacent the axially inner end of the mounting groove.

5. A wheel according to claim 4, in which the outer edge of the second circumferential groove includes a hole emerging outside the disk intended to receive an inflation valve.

6. A wheel according to claim 4, in which the circumferential groove serves as housing for a tire pressure monitoring device.

7. A wheel according to claim 4, in which the second support zone contains a radially outer protrusion intended to block the axial displacement of a support ring.

8. A wheel according to claim 4, in which the second support zone contains a radially inner protrusion intended to block the axial displacement of a support ring.

9. A wheel according to claim 4, in which the second support zone has a diameter greater than that of the first support zone, an edge connecting the mounting circumferential groove and said second support zone serving to prevent a support ring from moving axially.

10. A wheel according to claim 4, in which the said bearing surface is covered radially outside, at least in part, by a cylindrical hoop-shaped support intended to receive a tread support ring.

11. A wheel according to claim 10, including a support which has circumferentially arranged holes.

12. A wheel according to claim 10, in which said hoop is rigidly join to the rim.

13. A wheel according to claim 10, in which said hoop-shaped support is removably mounted on the rim.

14. A wheel according to claim 10, in which said hoop-shaped support is an integral part of a tread support ring.

15. A wheel according to claim 4, in which the rim is made of sheet metal.

16. A wheel according to claim 15, in which the rim and the disk are each made of sheet metal and in which assembly of the disk and the rim is carried out by insertion of part of the disk under the second circumferential groove.

17. A wheel according to claim 16, in which interfacing surfaces of the rim and disk beneath the second circumferential groove are joined together.

* * * * *

UNITED STATES PATENT AND TRADEMARK OFFICE
CERTIFICATE OF CORRECTION

PATENT NO.     : 6,470,936 B2
DATED          : October 29, 2002
INVENTOR(S)    : Pauc et al.

It is certified that error appears in the above-identified patent and that said Letters Patent is hereby corrected as shown below:

Column 2,
Line 34, "invention;" should read -- invention; and --
Line 44, "terminated" should read -- terminate --
Line 53, "axially" (first occurrence) should be deleted Column 4,
Line 64, "a" (second occurrence) should be deleted Column 5,
Line 20, "the circumfer-" should read -- the second circumfer- --
Lines 25 and 28, "support" should read -- tread support --

Column 6,
Line 6, "said" should be deleted
Line 12, "hoop" should read -- hoop-shaped support --

Signed and Sealed this

Third Day of June, 2003

JAMES E. ROGAN
*Director of the United States Patent and Trademark Office*